May 30, 1933.  R. A. COLE ET AL  1,911,552
GRINDING MACHINE
Filed Sept. 22, 1928    3 Sheets-Sheet 1

Fig. 1

Witnesses:
H. W. Kenway
Dorthy A. Williams

Inventor
RAYMOND A. COLE
ALBERT G. BELDEN
By Clayton R. Jenks
Attorney

May 30, 1933.  R. A. COLE ET AL  1,911,552
GRINDING MACHINE
Filed Sept. 22, 1928   3 Sheets-Sheet 2

Fig. 2.

Witnesses:

Inventor
RAYMOND A. COLE
ALBERT G. BELDEN
By
Attorney

Patented May 30, 1933

1,911,552

UNITED STATES PATENT OFFICE

RAYMOND A. COLE AND ALBERT G. BELDEN, OF WORCESTER, MASSACHUSETTS, ASSIGNORS TO NORTON COMPANY, OF WORCESTER, MASSACHUSETTS, A CORPORATION OF MASSACHUSETTS

GRINDING MACHINE

Application filed September 22, 1928. Serial No. 307,729.

This invention relates to machines for precision grinding. Its object is to provide a machine for automatically grinding work pieces to size within closer limits than has been practical heretofore under commercial conditions.

In the art to which this invention relates, variations in the diameter of the work piece are usually reckoned in tenths of a thousandth of an inch. The machine of our invention is designed to operate automatically in duplicating work pieces with a variation of not over two-tenths of a thousandth in the diameter. Under such conditions of extreme precision, numerous factors must be reckoned with which it has not been necessary to consider heretofore; for example, the grinding operation must be concluded while the work is subjected to practically no side pressure, as the displacement of its supporting centers due to compression of the oil film in their bearings is a factor of noticeable magnitude. Moreover, there is always a certain amount of spring or give in the various parts of the machine which cause variation in the final diameter of the work unless it is permitted to be completely dissipated and relieved in concluding the grinding operation. Further, the work itself suffers a slight distortion if subjected to pressure and will not be found circular in cross section within the desired limits unless it too is relieved of all strains in the final grinding.

Attempts have been made heretofore to gauge or size the work during the progress of the grinding operation by caliper devices and to control the grinding feed through the action of such device. Calipering mechanism, however, has introduced further elements of inaccuracy; for example, where an electric circuit has been made or broken by the movement of the caliper in controlling the feeding mechanism, the duration of the arc between the contact points has been variable and has become uncertain as the contact points became pitted in use. Attempts have been made to overcome this by terminating the feed at a point arbitrarily selected before the calipering device arrives at its position corresponding to the desired finished size, but none of these mechanisms, so far as is known, has been successful in duplicating the work consistently within the limits desired.

With these conditions in view, an important feature of the invention consists in a calipering device for sizing the work as it is ground, having a member movable in accordance with the size of the work and a series of contact elements arranged to be made operative successively by the continued movement of said calipering device as it follows the work. Where two sets of contact elements are employed, the first may be utilized to terminate the grinding feed movement so that the work and the grinding wheel are allowed to rotate without continuing lateral pressure until the strains of the machine and distortion of the work are entirely dissipated and the grinding operation is concluded with the parts in a condition entirely free from strain. The second set of contact elements may be utilized to control the automatic separation of the work and grinding element when this condition has been reached and the calipering device indicates the required finished diameter.

Other features of the invention relate more particularly to the construction of a calipering device for use in automatic grinding machines and in novel features of construction whereby extreme precision of action is secured. As herein shown, a pivotally mounted tripping member is provided which is responsive to the action of a feeler rod, which comprises one element of the caliper. The contact elements above mentioned are located upon the tripping member at points remote from its axis, while the feeler rod operates positively on the tripping member at a point adjacent to its axis, thus multiplying the movement of the caliper element in the swing of the tripping member. Preferably, the tripping member is of bell crank construction and enclosed in a casing of similar shape in which the corresponding contact elements are adjustably mounted. This constitutes a compact and direct-acting organization which is self-contained and may be embodied at any convenient location in the organization of the grinding machine with good advantage.

Another important feature of the invention consists in the employment of a first or low energy electric current in connection with the calipering device which, in turn, is utilized to operate relays and thus govern a second or high energy circuit sufficient to operate solenoids or otherwise to effect the mechanical motions necessary to control the feeding mechanism for terminating the grinding feed and separating the work and grinding wheel. An important advantage of this construction is that a circuit which is made or broken under the delicate control of the calipering device may be of such low voltage that no appreciable arc is formed and no pitting of the contact points results. The difficulties and inaccuracies which have been encountered heretofore on this account are, therefore, obviated. On the other hand, the relay which is energized by the low voltage current is of sufficient power to operate an oil switch or other form of non-arcing contact device for controlling the relatively high voltage current required to operate the feed mechanism controls.

In one aspect the present invention consists in the development or carrying forward of the principles disclosed in the patent to Raymond A. Cole No. 1,815,049. In that application the invention is shown as embodied in fluid pressure mechanism, whereas electrically operated mechanism is utilized in the present instance.

These and other features of the invention will be best understood and appreciated from the following description of a preferred embodiment thereof, selected for purposes of illustration and shown in the accompanying drawings, in which.

As illustrated in the drawings, a grinding machine is shown comprising a base 10 upon which is mounted a grinding wheel slide 11 having a driven grinding wheel 12 rotatably mounted thereon. The wheel slide 11 is mounted on the usual V and flat ways and is adapted for transverse movement toward and from the work. A work table 13 is mounted to slide longitudinally of the base on suitable ways (not shown) and is provided with a headstock 14 and a tailstock 15 which are adapted to support a work piece 16 for rotation in contact with the grinding wheel. The work table 13 is traversed longitudinally of the base by a hand wheel 18 which turns a gear 19 meshing with a gear 20. The gear 20 in turn meshes with a small gear 21 which, in turn, meshes with a rack 22 on the under side of the table 13. It is apparent from this construction that movement of the hand wheel 18 is effective to traverse the work supporting table longitudinally of the base to position the work in the desired location relative to the operative face of the grinding wheel 12.

Figure 2:
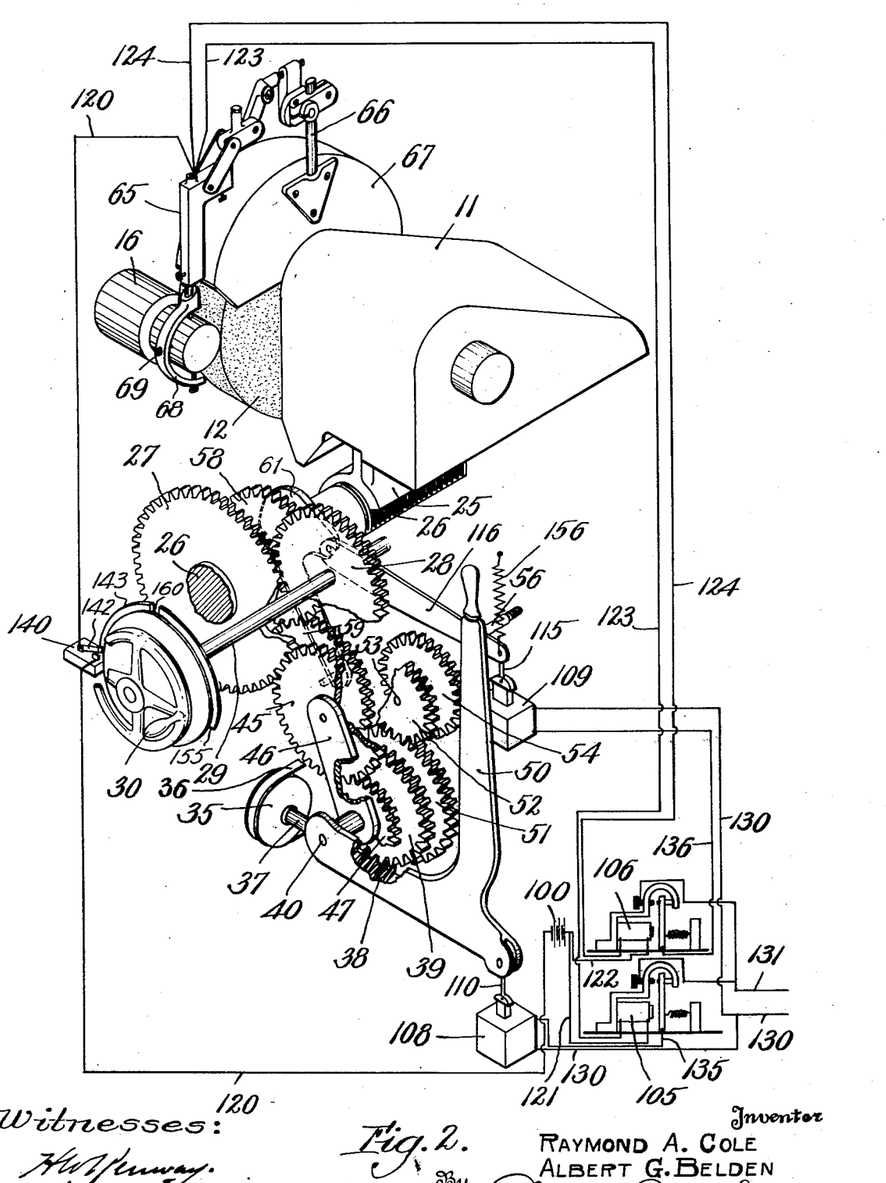
Fig. 2 is a view in perspective of the feeding mechanism combined with a wiring diagram of the electrical circuits.

As herein shown in Fig. 2, the feeding mechanism includes a half-nut 25 mounted on the under side of the wheel slide 11 meshing with a feed screw 26. A gear 27 is mounted on the outer end of the feed screw 26 and meshes with a gear 28 on the shaft 29. The outer end of the shaft 29 is provided with a hand wheel 30 which may be manually rotated to turn the feed screw 26 through the gear 28 and 27 in either direction to move the grinding wheel toward or from the work.

In order that the feed screw may be turned automatically to move the wheel slide 11 in either direction toward or from the work, a power driven mechanism is provided which includes a pulley 35 driven by a belt 36 from any suitable source of power. The pulley 35 is secured to a shaft 37 which is mounted in suitable bearings (not shown) in the base 10 of the machine. The shaft 37 is provided with a worm 38 meshing with a gear 39 journaled on a transverse shaft 40. Power may be transmitted from the gear 39 to rotate the feed screw by any suitable driving connection but in the preferred construction a tumbler gear 45 is provided upon swinging arms 46 which are mounted to swing with the shaft 40 about the axis of said shaft as a pivot. The gear 45 in turn meshes with a gear 47 journaled on the shaft 40 and secured to the gear 39 so that as power is applied to the pulley 35 the gear 47 transmits power to the tumbler gear 45 in all positions of the arms 46. A lever 50 is fastened on the outer end of the shaft 40 to turn the arms 46 and hence to permit manual control of the movement of the tumbler gear 45. By movement of the lever 50 toward the left, as viewed in Figs. 1 and 2, the operator may throw the gear 45 into mesh with the gear 27 on the outer end of the feed screw 26, thereby causing a rotation of the feed screw in the direction to feed the grinding wheel toward the work. A spring pressed plunger 56 is mounted on the front of the machine base and contacts with a projection on the rear of the lever 50 to hold the lever in its operative position so that the gear 45 is maintained in mesh with the gear 27.

To obtain a reverse feed, that is, to move the grinding wheel rearwardly after the grinding operation has been completed, a mechanism is provided for rotating the feed screw by power in the opposite direction to move the grinding wheel rearwardly at a higher rate of speed than that at which it moves forwardly in its grinding feed movement. To accomplish this a large gear 51 is mounted on the shaft 40 to be driven by power imparted to the gear 39 and said gear 51 is arranged to mesh with a gear 52 on a counter shaft 53. The shaft 53 also carries a gear 54 which is either integral with or fixed to the gear 52. A gear 58 is mounted on the feed screw and meshes with a tumbler gear 59 which is rotatably supported on a stud 60 carried by a bell crank lever 61. The bell crank lever 61 is pivoted to swing upon a portion of the feed screw shaft 26 so that it may be moved to roll the gear 59 into mesh with the gear 54 on the counter shaft 53. It will be noted that the gears 52 and 54 constitute intermediate gears to give a reversal in direction of rotation to the feed screw. It will be readily seen from the construction described that by throwing the gear 45 into mesh with the gear 27, a slow forward or infeed of the grinding wheel toward the work is obtained and that by rolling the tumbler gear 59 into mesh with the intermediate gear 54, a rapid reverse feed is produced to move the grinding wheel rapidly away from the work to an inoperative position.

Automatic means for controlling the feeding mechanism in grinding successive pieces of work to a predetermined size will now be described. This includes a calipering device arranged to contact with the work during the grinding operation and a tripping member responsive to the action of the calipering device as the grinding operation progresses and the work size is reduced. The calipering device may be combined with a steadyrest or mounted on a fixed part of the machine or work table, but for the sake of illustration it has been shown as mounted on a bracket 66 which is fixed to the wheel guard 67. An L-shaped casing 65 is provided with a calipering head 68 having a pair of adjustable contact screws 69 and 70 (Fig. 3) and a vertically movable plunger 71 arranged to engage the surface of the work at a point diametrically opposite the adjustable stop screw 70. By manipulating the adjusting screws 69 and 70, the head may be adjusted so that when the work has reached a predetermined size, the screw 70 and plunger 71 will engage the work on a diameter. These adjustable screws and plunger are preferably provided with contact points of some non-wearable material, such as diamond set in the ends thereof, so that wear on the contact points will be reduced to a minimum. The plunger 71 constitutes a feeler rod and is mounted in a suitable bearing 72 formed in the long leg of the casing 65. It contacts at its upper end with the short arm 73 of the bell crank lever 74 which is pivotally mounted on a stud 75 in the casing 65 and constitutes the tripping member of the mechanism. A spring 76 is mounted in a boss 77 of the casing 65 and bears against the arm 73 of the tripping member 74 to exert pressure in a downward direction to maintain the feeler rod 71 in operative contact with the surface of the work. The spring 76 is, as illustrated, backed by a screw 79 held in position by a lock nut 80 so that the compression of the spring may be adjusted as desired.

The calipering device operates two pairs of contact members, one acting to terminate the power infeed of the grinding wheel and permit the finish grinding operation to take place while the grinding wheel carriage remains stationary; and the second operating to initiate the reverse feed in which the grinding wheel is rapidly removed from engagement with the work. The short arm 73 of the bell crank tripping member 74 is provided with a contact element 85 which is arranged to make contact with a stationary but adjustable contact element 86. The element 86 is insulated from the casing by a strip of insulating material 87 and is provided with an adjusting screw 88 and lock nut 89 so that the position of the contact element 86 may be adjusted as desired. These contact elements, as will presently appear, are connected and arranged to throw out the infeed of the grinding wheel and thereby terminate the movement of the grinding wheel toward the work. The long arm 90 of the tripping member 74 is provided with a contact element 91 at its lower end which is adapted to engage a contact element 92 mounted in the casing 65. The contact element 92 is insulated from the casing 65 by a strip of insulating material 93. An adjusting screw 94 and lock nut 95 are threaded into the casing 65 and adapted to adjust the position of the contact element 92 so that the time of making the circuit may be varied. The contact elements 86 and 92 are each provided with insulating blocks 98 and 99 respectively so that the contact elements are insulated from the adjusting screws 88 and 94 respectively. The contact elements 91 and 92 are included in an electric circut whch throws the reverse or back feed into operation.

Figures 3, 4, 5:
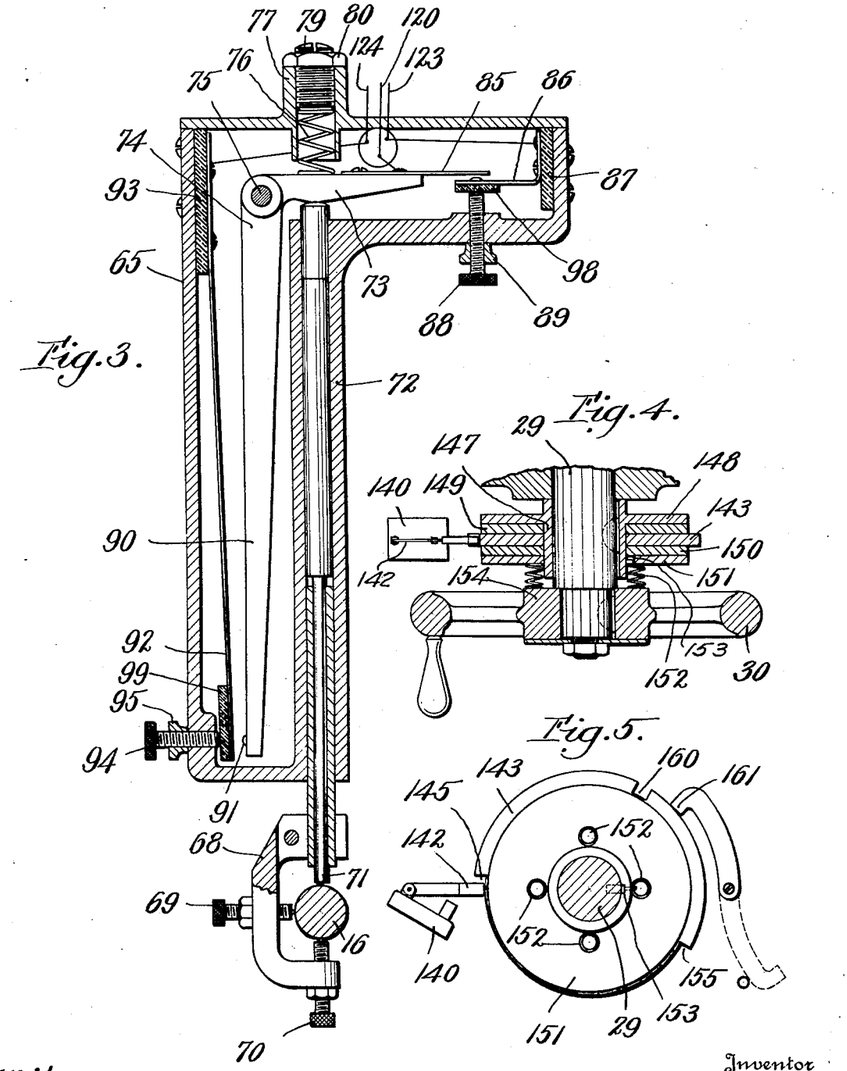
Fig. 3 is a view in longitudinal section of the calipering device and associated parts.
Fig. 4 is a view in horizontal section through the feed wheel and associated parts.
Fig. 5 is a view in front elevation of the switch mechanism operated by the hand wheel.

It will be readily seen from the construction illustrated in Fig. 3 that as the work is reduced in size by the grinding wheel, the spring 76 will maintain the feeler rod 71 in continuous contact with the work as it is ground away. Continued reduction in size of the work allows the feeler rod to move downwardly and responsive to this movement the tripping member 74 will swing in a clockwise direction, making contact first between the elements 85 and 86 and then between the elements 91 and 92.

The circuits which include the two pairs of contact elements are operated on low energy to minimize the effect of arcing which is detrimental to the accuracy of the operation of the mechanism and to make the mechanism more sensitive. As indicated in Fig. 2 of the drawings, a battery 100 may be utilized to supply current for the low voltage circuits. In order that low voltage current may be utilized at the make and break contact elements operated in the size-finding operation, it is desirable to connect the circuit operated by said members to relays, which, in turn, control high voltage circuits. The high voltage circuits are arranged sucessively to operate solenoids which, in turn, are arranged to operate the tumbler gears already described and thereby control the feeding action of the grinding wheel. As shown in Fig. 2, a pair of relays 105 and 106 are arranged in circuit with solenoids 108 and 109 which, in turn, act to operate the tumbler gears 45 and 59 respectively.

Figure 1:
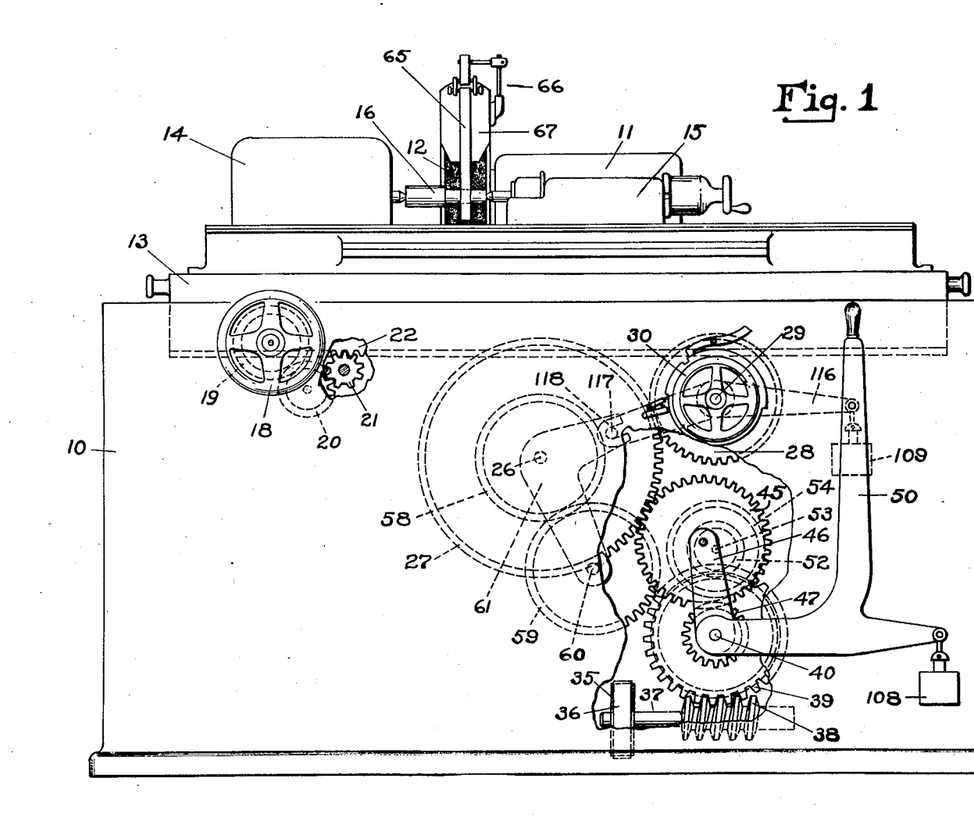
Fig. 1 is a view in front elevation of a grinding machine embodying our invention.

The solenoid 108 is mounted on the base of the machine and is operatively connected by a link 110 to the lever 50 and is arranged so that when the solenoid is energized, it pulls the lever 50 toward the right, as viewed in Figs. 1 and 2, and thereby withdraws the tumbler gear 45 from mesh with the gear 27 and stops the infeed of the grinding wheel.

The solenoid 109 is also mounted on the base and is connected by a link 115 to the end of a lever 116 which is mounted to rock on the shaft 29 as an axis. The lever 116 is formed as a bell crank lever and is provided in its other arm with a pin 117 which is engaged by a yoked portion 118 in the end of the bell crank lever 61. It is apparent from this construction that when the solenoid 109 is energized, the lever 116 is rocked downwardly at the end adjacent the solenoid and the bell crank lever 61 is rocked thereby to throw the tumbler gear 59 into mesh with the gear 54 to start rotation of the feed screw in the reverse direction and remove the grinding wheel from operative engagement with the work.

One terminal of the battery 100 is connected by a wire 120 to a terminal post on the casing 65 which is, in turn, connected to the bell crank tripping member 74 within the casing. The other terminal of the battery is connected by wires 121 and 122 to one terminal of the electro-magnet of each of the relays 105 and 106 respectively. The other terminals of the electro-magnets of relays 105 and 106 are connected by wires 123 and 124 to terminal posts on the casing 65 and are, in turn, connected to the contact members 86 and 92 respectively. The high voltage current may be taken from any suitable source, such as the commercial power lines, as indicated by the wires 130 and 131. The wire 130 is connected to one terminal of each of the solenoids 108 and 109 respectively. The wire 131 is connected to one terminal of the make and break contacts on each of the relays 105 and 106 which may be an oil switch or other non-arcing contact, although indicated only diagrammatically in Fig. 2. The other terminals of the make and break points on each relay are connected by wires 135 and 136 to the other terminals of the solenoids 108 and 109 respectively.

A switch 140 is provided in the wire 120 between the battery terminal and the caliper-controlled mechanism and is preferably located so that it may be automatically actuated by the feed mechanism of the machine. The switch 140 is mounted on the base of the machine and arranged so that it is thrown by the rotation of the feed screw. The switch 140 is positioned so that the switch handle 142 is arranged to be engaged by a disk 143 having a cut-out portion to permit turning of the disk without movement of the switch knife and having two tripping projections 145 and 155. It is readily seen from this construction that when the lever 50 is swung towards the left to throw the tumbler gear 45 into mesh with the driving gear 27 and thereby cause an infeed of the grinding wheel, the gear 28 and shaft 29 are rotated, as is also the disk 143 connected thereto. The projecting portion 145 of the disk at the proper time in the cycle engages the handle 142 of the switch 140 and closes the low voltage circuit. This circuit may be closed at any time before the rough grinding operation has been completed.

The disk 143 is rotatably mounted on a sleeve 147 which is keyed on the shaft 29 and is rotated, by frictional engagement with a flange 148 integral with the sleeve 147, in either direction as the hand wheel 30 is turned. A friction disk 149 is rotatably mounted on the sleeve 147 between the disk 143 and flange 148. A second friction disk 150 is rotatably mounted on the sleeve 147 on the opposite side of the disk 143. Another disk 151 is loosely mounted on the sleeve 147 and is driven by a pin 153. The disk 151 engages the outer face of the friction disk 150 and is yieldingly urged toward it by a plurality of springs 152 which are interposed between the disk 151 and hub 154 of the hand wheel 30. The springs 152 are of sufficient tension to maintain the desired friction connection between the disk 143 and the shaft 29 to permit opening and closing of the switch at the desired point but will permit the disk to slip, while the further feeding movement of the grinding wheel will reduce the work to the predetermined size.

The switch 140 is closed as the shaft 29 rotates during the infeed of the grinding wheel. The infeed of the grinding wheel continues until the contact member 85 engages the contact member 86, thereby closing the circuit and operating the relay 105 which closes the high voltage circuit and energizes the solenoid 108. When solenoid 108 is energized, it pulls downwardly on the link 110 and swings the lever 50 toward the right, as viewed in Figs. 1 and 2, and the tumbler 45 is rocked out of engagement with the gear 27. This movement disconnects and stops the power infeed of the grinding wheel when the work has been rough ground. The finish grinding operation continues until the contact point 91 engages the contact member 92, thereby closing the low voltage circuit through the wire 124 and operating the relay 106 which, in turn, closes the high voltage circuit and energizes the solenoid 109. When solenoid 109 is energized, it pulls downwardly on the link 115 and actuates the lever 116 to throw the tumbler gear 59 into mesh with the reverse drive gear 54 to cause the feed screw to turn in the reverse direction and thereby remove the grinding wheel from operative engagement with the work. The rearward movement of the grinding wheel continues until the frictionally rotated disk 143 turns a sufficient distance so that the shoulder 155 engages the under side of the handle 142 of the switch 140 and withdraws the switch knife and breaks the low voltage circuit. The breaking of the low voltage circuit operates through the release of the relay 106 to break the high voltage circuit and to de-energize the solenoid 109 and thereby permit the tension of a spring 156 to rock the lever 116 and to withdraw the tumbler gear 59 from operative engagement with its driver 54, thereby stopping the out-feeding movement. The operator then swings the size-finder head 65 out of contact with the surface of the work to permit removal of the finish ground piece of work from the machine and inserts a new piece in operative position. The cycle of operation may then be repeated.

In case it should be desired to reset the feed mechanism in changing wheels or in setting up for grinding larger sized pieces of work, the operator may manually rotate the hand wheel 30 until the notch 160 in the disk 143 comes into alignment with the pawl 161. The operator then swings the pawl 161 into engagement with the notch 160 and locks the friction disk 143 against further rotation. This permits the operator manually to rotate the hand wheel 30 to adjust the position of the grinding wheel relative to the electrical apparatus. The contact members are also provided with adjustments to vary the time of contact when resetting the mechanism for grinding a new size of work. The adjusting screws 88 and 94 are provided to adjust the position of the contact members 86 and 92 respectively.

The operation of this mechanism will be readily apparent from the foregoing disclosure but will be summarized for convenience. The operator places a piece of work 16 in the machine mounted on centers and then starts the rotation of the work and of the grinding wheel. He then swings the lever 50 toward the left, as viewed in Figs. 1 and 2, to throw the tumbler gear 45 into mesh with the gear 27 and thereby start the infeed of the grinding wheel toward the work. The operator then swings the caliper head 65 downwardly into operative contact with the surface of the work. The grinding wheel 12 is fed continuously toward the work to grind the same to the desired predetermined size. During the reduction in size of the work, the plunger or feeler rod 71 is maintained in contact with the surface of the work by the action of the spring 76 which continuously urges the plunger toward the work, thereby holding the lower adjusting screw or contact member 70 also in operative engagement therewith. This preliminary or rough grinding operation continues until the contact member 85 engages the contact member 86, thereby closing the low voltage circuit which operates through a relay to energize the solenoid 108 which, in turn, is connected to swing the lever 50 toward the right, as viewed in Figs. 1 and 2, to roll the tumbler gear 45 out of mesh with the gear 27. This movement stops the rough grinding operation and leaves the grinding wheel in grinding contact with the surface of the work. The grinding wheel continues to grind on the work piece to finish grind the same. This finish grinding operation continues until the contact member 91 engages the contact member 92, thereby closing the second low voltage circuit which operates through relay 105 to energize the solenoid 109 and thereby throw the tumbler gear 59 into engagement with the gear 54 and cause a rearward movement of the grinding wheel to remove it from operative engagement with the surface of the work. As the feed screw 26 starts turning in the rearward direction, the rotation is transmitted through gear 27 and gear 28 to shaft 29 which, in turn, rotates the disk 143. As the rotation of this disk 143 continues, the shoulder 155 will contact with the handle 142 and thereby open the switch 140. As soon as the switch 140 is opened, the low voltage circuit is thereby opened which releases the relay 160, thereby breaking the high voltage circuit and de-energizing the solenoid 109 and permitting the tension of the spring 156 to rock the lever 116 and roll the tumbler gear 59 out of mesh with the gear 54, thereby stopping the rearward movement of the grinding operation. The operator then brings the size-finder head 65 out of contact with the work to an inoperative position and replaces the finished piece of work with a new piece.

It will be understood that the calipering device as a unit is supported in a manner similar to that disclosed in the prior application above identified, that is to say, one of the supporting links carries a spring plunger acting at all times to lift the calipering device bodily so as to maintain the lower contact screw 70 in engagement with the lower side of the work. The casing 65 with the tripping member 74, therefore, moves upwardly as the feeler rod 71 moves downwardly and the relative movement of these two elements is effective in swinging the tripping member to close the contacts in the electrical circuits.

Having thus described our invention, what we claim as new and desire to secure by Letters Patent is:

1. In a grinding machine, a work support and a grinding element relatively movable to effect a grinding feed, feeding mechanism, a calipering device, a movable member mounted independently of the calipering device and responsive to the action thereof separate contact elements mounted on said member, adjustable feed-controlling resilient contact elements arranged to be engaged successively in the continued movement of said member, rigid adjusting members behind said resilient contact elements, and means governed by said contact elements controlling said feeding mechanism.

2. In a grinding machine, a work support and a grinding element relatively movable to effect a grinding feed, feeding mechanism, a calipering device, a pivotally mounted member responsive to the action of the calipering device and having a long arm and a short arm angularly related to each other and each carrying contact elements, cooperating feed-controlling contact elements disposed in the path of movement of the arms of said member, one set of said elements being yieldingly engaged to allow continued movement of said contact carrying member, and means governed by said contact elements controlling said feeding mechanism.

3. In a grinding machine, a work support and a grinding element relatively movable to effect a grinding feed, feeding mechanism, a calipering device, a movable tripping member having separate contact elements and being responsive to the action of the calipering device, feed-controlling spring contact elements arranged to coact successively with said separate contact elements as the tripping member moves continuously, adjusting screws opposing the resilience of said spring contact elements operating to predetermine the position thereof, and means governed by said contact elements controlling said feeding mechanism.

4. In a grinding machine, a work support and a grinding element relatively movable to effect a grinding feed, feeding mechanism, a calipering device including a slidably mounted feeler rod engaging the work, a tripping member pivotally mounted with a part in line with said feeler rod, being thereby responsive to the movement of the feeler rod and having separate contact elements, independently adjustable feed-controlling contact elements associated with the contact elements of the tripping member, and electrically operated control mechanism for said feeding mechanism rendered active by the interaction of said associated contact elements.

5. In a grinding machine, a work support and a grinding element relatively movable to effect a grinding feed, feeding mechanism, a casing carrying a calipering device including a work-measuring feeler rod mounted for longitudinal movement in the casing, a bell crank tripping member pivotally mounted in the casing with one arm in line with said feeler rod for engagement therewith and movement thereby and the other substantially parallel thereto, contact elements mounted upon the respective arms of said tripping member, adjustable feed-controlling contact elements coacting with those on the tripping mechanism and mounted in said casing, and means governed by said coacting sets of contact elements controlling said feeding mechanism.

6. In a grinding machine, a work support and a grinding element relatively movable to effect a grinding feed, feeding mechanism, a calipering device including a calipering head and a slidably mounted feeler rod, a bell crank tripping member suspended adjacent to said feeler rod with one arm in line therewith, spring means for maintaining the tripping device in contact with the feeler rod and the calipering head and feeler rod in contact with opposed sides of the work and a series of cooperating feed-controlling contacts arranged to act successively as said tripping member swings upon its axis to control said feeding mechanism.

7. In a grinding machine, a work support and a grinding element relatively movable to effect a grinding feed, reversible feeding mechanism, a calipering device, a pivotally mounted tripping member having arms of unequal length and being responsive to the action of the calipering device, a contact element carried by each arm of said tripping member, and a feed-stopping contact and a feed-reversing contact arranged respectively in the path of movement of the arms of the tripping member.

8. In a grinding machine, a work support and a grinding element relatively movable to effect a grinding feed, feeding mechanism, an L-shaped casing carrying a calipering device, a feeler rod arranged to slide in said casing, an L-shaped tripping member pivoted within the casing with its short arm in line with said feeler rod, a contact element near the end of each arm of said tripping member, and cooperating feed-controlling contact elements adjustably mounted within said casing.

9. In combination with a grinding machine having a work support and a grinding element which are relatively movable to effect a grinding operation and electrically controlled reversible feeding mechanism to cause, stop and reverse such movement for grinding a work piece, a calipering device having a movable feeler engageable with the work, an electric circuit of low energy including a relay switch which is operated in response to movement of the calipering device during the grinding operation, a second circuit of high energy including a device rendered effective by movement of said relay switch which controls the feed mechanism and causes the feeding movement to stop when the work has reached a predetermined size and electrically operated means to cause the feeding mechanism to reverse and remove the wheel to a position remote from the work after the work has been finished.

10. In combination with a grinding machine having a work support, a grinding wheel mounted for movement towards the work to grind the same and feeding mechanism to effect such grinding movement, a work calipering device having a movable feeler engageable with the work, an electric circuit of low energy including a relay switch which is rendered effective in response to movement of the feeler to a predetermined position during the grinding operation, a second electric circuit of high energy governed by said relay switch which includes a solenoid and means operatively connecting the solenoid to stop the wheel feeding mechanism when the second circuit is made by said relay switch.

11. A grinding machine having a work support and an abrading element which are relatively movable towards each other, reversible feeding mechanism to effect a feeding movement therebetween, a calipering device engageable with the work, two electric circuits having contact members therein which are successively rendered effective by the calipering device as the latter responds to a reduction in size of the work and means controlled by said successively effective circuits which first stops the in-feed movement of the abrading element when the work has been ground to a predetermined size and thereafter causes a reverse movement when the work has been ground to a second predetermined size determined by said calipering device.

12. In combination with a grinding machine having a work support, a grinding wheel movable towards and from the work to grind the same and an electrically controlled reversible feeding mechanism to cause such movement, a calipering device engageable with the work, two electric circuits of low energy including relay switches which are successively rendered effective in response to movement of the calipering device to different predetermined positions during the grinding operation, and electric circuits governed by the relay switches of the low energy circuits which include solenoids connected to cause the feeding mechanism to stop when the calipering device reaches a first predetermined position and to reverse when the device reaches a second position.

13. In combination with a grinding machine having a support and a grinding wheel which are movable relatively towards and from each other and a reversible feeding mechanism to cause such movement and feed the wheel into the work, a calipering device having a movable feeler which moves with a reduction in the size of the work being ground, electrically operated means responsive to one position of said feeler while in engagement with the work during the grinding operation which is connected for stopping the forward feed of said mechanism and causing a dying-out grinding operation, and electrically operated means responsive to a second position of the feeler when the work has been reduced further to a predetermined size which causes the feeding mechanism to operate and withdraw the grinding wheel from contact with the work.

14. In combination with a grinding machine having a support for rotatable work, a grinding wheel which is movable towards and from the work and a reversible wheel feeding mechanism, a calipering device having a movable feeler engageable with the work during the grinding operation and electric control mechanism effective to stop the forward feed of the wheel, electric control mechanism effective to cause a reversal of the feeding mechanism, electrically operated means which is rendered effective by the feeler, when the latter has reached a predetermined position indicating a given work size, to render the first named control mechanism operative and stop the forward feed of the grinding wheel and cause a dying-out grinding operation and a second electrically operated means responsive to a second position of the feeler when the work has been further reduced to a predetermined size which causes the second named control mechanism to operate the reverse feeding mechanism and remove the wheel from contact with the work.

15. In a grinding machine, a work support and a grinding element relatively movable to effect a grinding feed, electrically controlled feeding mechanism to bring said support and grinding element together, a calipering device engaging the work, a tripping member responsive to the action of the calipering device, a low voltage circuit controlled by said tripping device and including a relay switch, and a high voltage circuit governed by said relay switch for controlling said feeding mechanism.

16. In a grinding machine, a work support and a grinding element relatively movable to effect a grinding feed, to bring said support and grinding element together, electrically controlled feeding mechanism, a calipering device engaging the work, a low voltage circuit controlled by said calipering device and including a relay switch, a solenoid for throwing the feeding mechanism out of operation, and a high voltage circuit governed by said relay switch for operating said solenoid.

17. In a grinding machine, a work support and a grinding element relatively movable to effect a grinding feed, electrically controlled feeding mechanism, a calipering device, a tripping member responsive to the action of the calipering device and having separate sets of contact elements, low voltage circuits controlled by the respective sets of contact elements of said tripping member and each including a relay, and high voltage circuits governed by said relays, one being effective to terminate the grinding feed and the other to reverse it.

18. In a grinding machine, a work support and a grinding element relatively movable to effect a grinding feed, reversible feeding mechanism, a calipering device having connections for closing a circuit to initiate the reverse feeding operation, a separate switch in said circuit, and a tripping device operated by the feeding mechanism and independently of said calipering device for breaking said circuit and terminating the reverse feeding operation.

19. In a grinding machine, a work support and a grinding element relatively movable to effect a grinding feed, electrically controlled reversible feeding mechanism, a calipering device having contact elements for closing a circuit to initiate the reverse feeding operation, a separate switch in said circuit, and means directly responsive to the feeding movement arranged to automatically close said switch during the grinding feed and automatically to open said switch during the reverse feed to terminate the latter.

20. In a grinding machine, a work support and a grinding element relatively movable to effect a grinding feed, reversible feeding mechanism, a calipering device, a tripping member responsive to the action of the calipering device and having separate contact elements, means including a cooperating contact element and a relay controlled circuit for terminating the grinding feed, whereby the work and grinding element may grind out without feeding, and means including a second cooperating contact element and a relay controlled circuit for terminating such grinding out operation.

21. In a grinding machine, a rotatable work support, a grinding wheel, power feeding mechanism for moving the grinding wheel toward or away from the work, including a feed screw and oppositely driven trains of gear each including a tumbler gear, a calipering device arranged to operate separate contact elements, means including a cooperating contact element and a relay controlled circuit for throwing the tumbler gear of the grinding feed train out of mesh, and means including a second cooperating contact element and a relay controlled circuit for throwing the tumbler gear of the reverse train into mesh.

22. A grinding machine comprising a work support and a grinding element relatively movable to effect a grinding feed, means including an electrically controlled feeding mechanism for causing said grinding feed, a calipering device having a feeler engageable with the work, a low energy circuit including a member movable in response to the movement of said feeler which serves to vary the flow of electrical energy in said circuit, an electrical device controlling said feeding mechanism and a high energy circuit including means rendered operative by said variation in the low energy circuit which causes said electrical device to terminate the grinding feed when said feeler has indicated a predetermined work size.

23. A grinding machine comprising a work support and a grinding element relatively movable to effect a grinding feed, means including an electrically controlled feeding mechanism for feeding the wheel and the work relatively towards each other, a calipering device having a feeler engageable with the work, a low energy circuit including means governed by movement of said feeler which varies the flow of electrical energy in said circuit, an electrically controlled device for controlling the wheel feed mechanism and a high energy electrical circuit including means controlling said device and means governed by a variation in the low energy circuit which renders the high energy circuit operative to terminate the grinding feed when the work has reached a predetermined size.

24. A grinding machine comprising a work support and a grinding element which are relatively movable to effect a grinding feed, electrically controlled feeding mechanism to cause said feeding movement, a calipering device including a feeler movably engaging the work, a tripping member responsive to the movement of the feeler, an electric circuit, including a relay switch, rendered operative by the tripping member when said feeler has moved to a given position, and means including a second circuit governed and rendered operative by said relay switch for stopping said feeding mechanism when the calipering device indicates a predetermined work size.

25. A grinding machine comprising a work support and a grinding element which are relatively movable to effect a grinding feed, electrically controlled feeding mechanism to cause said feeding movement, a calipering device including a feeler movably engaging the work, an electric circuit, including a relay switch, rendered operative by the movement of said feeler to a predetermined position, means including a solenoid for controlling the feeding mechanism, and a second circuit governed by the operation of said relay switch for operating said solenoid when a predetermined work size has been obtained.

26. A grinding machine comprising a work support and a grinding wheel which are relatively movable to effect a grinding operation, means including an electrically controlled feeding mechanism to cause such grinding operation, a device including a feeler movably engaging the work and indicating the work size, an electric circuit including electrical means responsive to movement of the feeler which is rendered operative when the work has been ground to a predetermined size, an electric device controlling the operation of the feed mechanism and arranged to stop the grinding feed, and a second circuit including means responsive to the first circuit being rendered operative which serves to operate the control device and stop the infeed movement of the wheel when the work has been ground to a predetermined size.

27. A grinding machine comprising a work support and a grinding wheel which are relatively movable to effect a grinding feed, means including an electrically controlled, power driven, reversible feeding mechanism for feeding the wheel and the work relatively towards and from each other, a calipering device for engaging the work, an electric circuit of low energy including a member movable in response to the action of the calipering device which serves to vary the flow of electrical energy in said circuit, electrical means controlling the reversal of said feeding mechanism and a second circuit of high energy including an electrical device controlled by said variation in said first circuit which causes current to flow to and operate said electrical means and thus terminate the grinding action and immediately remove the wheel from the work when the calipering device indicates that a predetermined work size has been obtained.

28. A grinding machine comprising a work support and a grinding wheel which are relatively movable to effect a grinding feed, power operated mechanism, which includes forward and reverse feeding members, to feed the grinding wheel towards and from the work and to stop the same, a calipering device including a feeler engageable with the work, two low energy electric circuits, each including a set of relatively movable contact members arranged to control the flow of electrical energy in its circuit and rendered operative by movement of the feeler to a predetermined position, two high energy circuits each including means rendered operative by a variation in the electrical energy in its corresponding first circuit which are so arranged that the control of one circuit by the feeler operates to stop the infeed of the wheel when the work has reached a predetermined size, and the control of the second circuit operates when the work has been further reduced in size to cause a reverse feed of the grinding wheel.

29. A grinding machine comprising a work support and grinding wheel which are relatively movable to effect a grinding feed, an electrically controlled reversible feeding mechanism, a calipering device engaging the work, two electric circuits of low energy, each including a set of contact elements which are relatively moved in response to movement of the calipering device and a relay, two secondary electric circuits, each governed by one of said relays, means cooperating with one secondary circiut which acts upon effective movement of one relay by the calipering device to terminate the grinding feed, and means cooperating with the other secondary circuit which serves when the second relay is rendered effective by the calipering device to reverse the feeding mechanism and separate the grinding wheel and work support.

30. In combination with a grinding machine having a work support, a grinding wheel which is movable towards and from the work, an electrically controlled power driven feeding mechanism including a reversible clutch to feed the wheel for a grinding operation, a calipering device engageable with the work, two electric circuits of low energy, the current flow of which is controlled by the calipering device, and means including said circuits and two relay circuits controlled thereby which is effective to cause current to flow in the two relays successively as the calipering device indicates two predetermined work sizes, and electrical control apparatus including a solenoid in each relay circuit which is operatively connected to the clutch to stop the in-feed of the wheel when the work has been ground to a given size and cause a dying out cut to be taken and thereafter to throw the clutch to reverse the direction of travel of the wheel.

31. A work sizing apparatus of the type covered by claim 30 comprising an electric control device connected to throw the clutch to a neutral position when the wheel has been removed from the work and a switch to break the current flow in one of said circuits and render the work sizing apparatus ineffective.

32. In combination with a grinding machine having a work support and a grinding wheel which are movable relatively towards each other to grind the work and a feeding mechanism to cause such movement, a calipering device for measuring the work size, two electrical circuits of low energy, means controlled by the calipering device which successively varies the electrical energy in said circuits when the work has been ground to two predetermined sizes, electric control mechanism for decreasing and for stopping the grinding action, two high energy electrical circuits operatively connected to control said feeding mechanism, and means whereby the successive variation in electrical energy in the low energy circuits may successively render operative the high energy circuits and cause the work to be ground rapidly until a predetermined size has been reached and thereafter ground slowly and finally cause the grinding action to be stopped when the work has reached a predetermined final size.

33. In combination with a grinding machine having a work support and a grinding wheel which are relatively movable towards and from each other to grind the work and an electrically controlled reversible feeding mechanism to cause such movement, a calipering device having a feeler engageable with the work, a low energy circuit including means whereby the flow of electrical energy therein is varied in response to movement of said feeler, means including a high energy circuit and an electrical device operatively connected to control the feeding mechanism, means whereby the high energy circuit is energized to stop said feeding mechanism when the flow of electrical energy in the low energy circuit indicates a predetermined work size, and electrically operated mechanism to cause a reversal of the feeding mechanism when the work has been ground to a second predetermined work size.

34. A grinding machine comprising a work support, a grinding wheel movable to grind the work, means including an electrically controlled reversible feeding mechanism for feeding the wheel towards and from the work, a feeler contacting with the work, an electric circuit including means governed by movement of the feeler to vary the electrical energy in said circuit when the feeler reaches a predetermined position, means controlling said reversible feeding mechanism which is rendered effective by the variation in said circuit to cause the feeding mechanism to be reversed when the work has been ground to a predetermined size, and electrically controlled means to stop the grinding wheel at a given position in its rearward movement.

35. A machine of the type covered by claim 34 which includes means whereby the electrical control mechanism is rendered inoperative when the wheel has been removed to a predetermined position remote from the work.

Signed at Worcester, Massachusetts, this 15th day of Sept. 1928.

RAYMOND A. COLE.
ALBERT G. BELDEN.